United States Patent [19]
Dereng

[11] 4,264,279
[45] Apr. 28, 1981

[54] FIXED GEOMETRY SELF STARTING TRANSVERSE AXIS WIND TURBINE

[76] Inventor: Viggo G. Dereng, 702 Juniper Dr., Newport News, Va. 23601

[21] Appl. No.: 905,508

[22] Filed: May 12, 1978

[51] Int. Cl.³ .............................................. F03D 3/06
[52] U.S. Cl. ........................... 416/227 A; 416/197 A; 416/242
[58] Field of Search .................. 416/119, 111, 197 A, 416/242, 227 A

[56] References Cited

U.S. PATENT DOCUMENTS

| 1,467,699 | 9/1923 | Vinding et al. | 416/242 |
| 1,835,018 | 12/1931 | Darrieus | 416/227 A X |
| 1,953,444 | 4/1934 | Stalker | 416/17 |
| 2,023,750 | 12/1935 | Strandgren | 416/119 X |
| 4,012,163 | 3/1977 | Baumgartner et al. | 416/197 A X |
| 4,115,027 | 9/1978 | Thomas | 416/197 A X |

FOREIGN PATENT DOCUMENTS

| 456963 | 5/1949 | Canada | 416/242 |
| 892130 | 10/1953 | Fed. Rep. of Germany | 416/119 |
| 2051579 | 4/1972 | Fed. Rep. of Germany | 416/117 |
| 860930 | 12/1972 | Fed. Rep. of Germany | 416/119 |
| 929721 | 1/1948 | France | 416/52 |
| 952792 | 11/1949 | France | 416/119 |
| 1098995 | 8/1955 | France | 415/2 |
| 2298707 | 8/1976 | France | 416/197 A |

OTHER PUBLICATIONS

"Electrical Review", vol. 201, No. 12, Sep. 23, 1977, p. 31.

Primary Examiner—Everette A. Powell, Jr.
Attorney, Agent, or Firm—William D. Hall

[57] ABSTRACT

This invention relates to a fixed geometry self starting wind turbine having a blade rotatable about a vertical axis. The blade is of a wide streamlined cambered airfoil shape and has a forward portion that includes a well rounded leading edge and thickness distribution that is conducive to high lift to drag ratios and having a high drag characteristic in reversed flows. The concave curvature of this camber line of said airfoil is directed to the rotational axis. The wide blade in combination with the well rounded leading edge, camber and airfoil thickness gives the turbine improved self-starting characteristics and causes the turbine to have improved acceleration characteristics through the intermediate speed range and up to full operating speed.

25 Claims, 11 Drawing Figures

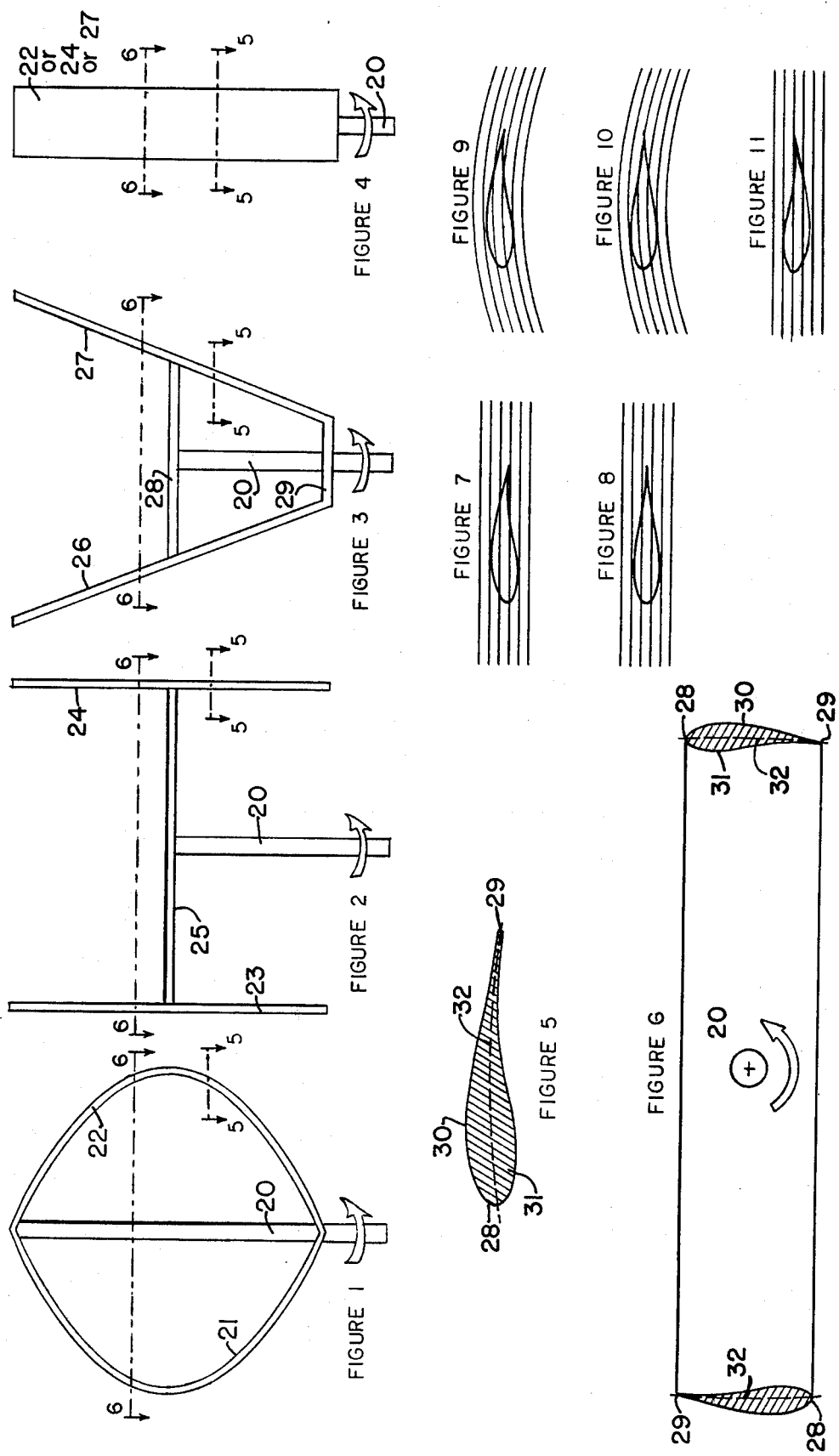

FIXED GEOMETRY SELF STARTING TRANSVERSE AXIS WIND TURBINE

BACKGROUND OF THE INVENTION

U.S. Pat. No. 1,835,018 to G. J. M. Darrieus, for a "Turbine Having its Rotating Shaft Transverse to the flow of the Current" was granted Dec. 8, 1931. Since then there has been considerable investigation of the Darrieus invention as well as a number of published articles addressing themselves to the Darrieus form of wind turbine. One drawback to the Darrieus turbine, recognized by the published literature, is that that turbine does not have self-starting characteristics, and has low operating torque while passing through intermediate speed ranges toward full operating speed.

The main object of this invention is to provide a turbine, which has excellent self-starting characteristics as well as increased torque through the intermediate speed range. Other objects and advantages of the invention will appear as this description proceeds.

SUMMARY OF THE INVENTION

A blade rotates about an axis transverse to the flow of the fluid medium, for example, a vertical axis. The cross-section of the blade is of a wide streamlined cambered airfoil shape and has a profile shape that includes a well rounded leading edge and thickness distribution that is conductive to high lift to drag ratios and having a high drag characteristic in reversed flows, to thereby give the turbine improved self-starting characteristics. The design of my blade, hereinafter described, also increases the torque of the turbine in its intermediate and high speed ranges.

In the drawings:

FIG. 1 is a front view of one form of the invention.

FIG. 2 is a front view of a second form of the invention.

FIG. 3 is a front view of a third form of the invention.

FIG. 4 is a side view of the invention. It is noted that the side view of FIG. 4 is in fact a side view of each of FIGS. 1, 2, and 3.

FIG. 5 is a representative cross-sectional view of one of the blades of each of FIGS. 1, 2, and 3, taken along the lines 5 of each of FIGS. 1, 2, and 3. The left end of FIG. 5 is the forward end, and the right end is the trailing end of the blade. The camber 32 of the blade of FIG. 5 is an imaginary line, fore and aft through the airfoil, that passes through the mean thickness distribution of the airfoil at all points.

FIG. 6 is a cross-sectional view of the invention, taken along lines 6—6 of FIGS. 1, 2, and 3. The same cross-sectional view applies to all three forms (FIGS. 1, 2, and 3).

FIG. 7 shows the blade of FIG. 5 in a straight air flow field, such as may be encountered at initial start.

FIG. 8 shows a prior art type of blade which is an uncambered airfoil in a straight air flow field, such as may be encountered at initial start.

FIG. 9 shows the blade of FIG. 5 in a curved flow field, such as might be encountered if the turbine is rotating.

FIG. 10 shows the prior art type of blade in a curved flow field, such as might be encountered if the turbine was rotating.

FIG. 11 shows a blade with the camber on the wrong side of the blade. This is aerodynamically the equivalent of a flat camber blade in a curved flow stream and, therefore, illustrates the aerodynamic problems that befall uncambered blades of the prior art form when the chord is merely extended to attempt to improve low speed performance.

The camber line 32 in FIGS. 5 and 6 passes midway between opposite sides of the airfoil.

DETAILED DESCRIPTION OF THE INVENTION

The turbine according to this invention comprises a main vertical shaft 20 mounted for rotation upon suitable bearings (not shown). In FIG. 1, a plurality of curved blades, for example blades 21 and 22, are rigidly secured to shaft 20 and rotate as a unit when driven by the wind. In FIG. 2 the blades 23 and 24 are vertical and are secured to shaft 20 by cross-arm 25. In FIG. 3, the blades 26 and 27 diverge from each other and are secured to the shaft 20, and to each other, by cross-arms 28 and 29.

The end views of FIGS. 1, 2, and 3 are the same and are shown in FIG. 4. The horizontal width of the blade is shown in FIG. 4 and this width is sometimes called the chord. For best resuls the chord should be 30 to 40% of the maximum radius (see FIGS. 1, 2, and 3) of the blade.

FIG. 5 shows a cross-sectional view of each of blades 21, 22, 23, 24, 26 and 27, taken along line 5—5 of FIGS. 1, 2, and 3. As appears from FIG. 5 the blade has a streamlined cross section with a forward portion 31 having a nose 28 and a trailing end 29. The forward portion 31 is convex and gets larger starting at nose 28 and continuing to the end 30 of the forward portion; the cross-section thereafter getting gradually narrower as the distance from the thickest part 30 to the trailing end 29 increases.

Cross-sectional views along lines 6—6 of all three FIGS. 1, 2, and 3 are the same. A representative such cross-section is shown in FIG. 6.

As used herein, the words "camber line" refer to a line along median thickness distribution of the airfoil.

The camber line 32 is preferably a portion of a circle whose radius is roughly equal to the radius of the turbine blade 21 or 22 or 23 or 24 or 26 or 27, as the case may be. The center point of the portion of the circle forming the camber line is, more or less, the same as the axis of rotation for high speed power turbine applications. However for other applications, such as flow measuring devices, the ratio of turbine rotor blade speed to wind velocity is reduced and a high degree of linearity relative to wind speed may be obtained by moving the center of the camber radius aftward relative to the airfoil direction thus away from the center of rotation in such a manner as to give the airfoil a negative angle of attack to the relative blade path. Tip speed ratios as low as 1-1 with excellent linearity, and sensitivity to low wind speeds, have been obtained in this manner.

The prior art teaches that in a transverse axis wind turbine the thickness ratio of the blade, that is the ratio of maximum thickness across the cross-section of FIG. 5 (see reference number 30) to the chord (distance from nose 28 to trailing end 29) should be about 0.10 to 0.12. This relationship works with my invention, although it is not satisfactory inasmuch as it requires much high wind velocity throughout the intermediate range of rotational speeds than are required of airfoils of 19% thickness ratio which have proven best when applied to my invention.

In general my airfoils (FIG. 5) should be plotted symmetrically about a curved camber line the radius of which is of the order of the radius of the rotor, and should be selected from a family of airfoils whose thickness distribution will provide a smooth continuous curvature on both the outermost and innermost surfaces and be conductive to high lift, low drag, and large center of pressure travels.

Airfoil chord widths showing the best average results have been between Fifteen (15) and Twenty (20) percent of the rotors maximum diameter. However, in open air this could be as small as 12% with very good results. To depart from this region will generally cause some deterioration in performance, i.e., smaller chords require higher wind velocity to start and/or traverse the intermediate range of speeds with but small gains in maximum speed and generally suffer a loss in torque over the complete range of operation. Conversely larger chords while starting and traversing at a lower wind velocity will suffer a loss in maximum speed with small gain in torque. In general it might be stated that lower wind speed favors the selection of the wider chord airfoils.

The three preceding paragraphs of this specification have concentrated on the controlling factors of two (2) bladed rotors. I shall now relate to single and three bladed rotors.

Maximum power per square foot of blade area is obtained from single bladed rotors when compared to multiple bladed rotors of equal geometric proportions. This is due to the rotor blade(s), during the portion of their rotational cycle which is on the streamwise trailing side of the rotor, having to experience multiple crossings of the trailing wake of the blade(s) during their transit of the streamwise leading side of the rotor cycle.

Systems requiring greater low speed torque may be designed around three bladed systems at some sacrifice of high speed performance.

Multiple blades in excess of three will probably prove economically unfeasible due to the diminishing power return of additional blades.

In order to begin to understand the unique fluid flow mechanics of the transverse shaft turbine, which even today defies ciomplete analysis, one must examine the wide range of conditions involved as the rotor (beginning from a standing position) first initiates motion and then proceeds to gather speed and momentum in a consistant and orderly fashion until the maximum tip speed ratio (u/v) is attained; where u is the peripheral speed of the blade, and v is the absolute speed of the fluid medium. Aerodynamically the blades (two or more equally spaced, fixed pitch), are seen to go from a standing position (as the rotor starts motion) to begin slowly tumbling forward, trailing edge over leading edge with the down wind facing blade having the flow stream passing from the trailing edge of the airfoil forward. This tumbling condition ceases as the rotor exceeds $u/v = 1$, and the blade now begins to experience an apparent pitching oscillation of near $\pm 90°$, which decreases as the rotor speed increases until the maximum tip speed ratio is attained.

The mode of my new turbine during starting will next be examined.

FIGS. 7 and 9, respectively, show the blade embodying my invention (having camber 32) in a straight air flow field and in a curved air flow field such as is encountered when the turbine rotates.

FIGS. 8 and 10, respectively, show a prior art type blade, having a symmetrical airfoil section in straight and in a curved air flow field such as is encountered when the turbine rotates.

FIG. 11 shows a blade, which does not embody my invention since it is a transformation from curved flow of FIG. 10 to linear flow of FIG. 11, to demonstrate the effect of a flat cambered airfoil in a curved flow field.

Considering FIGS. 7, 8, 9, 10, and 11, we shall display the improvement my invention presents over the prior art, by comparison of the two types of airfoils described and simplified flow streams.

FIG. 7 shows an airfoil representative of my invention (FIG. 5) superimposed on a linear flow fied as might be encountered by the rotor in standing position, with the air flowing from left to right. The cambered airfoil in this condition presents a high lift configuration that is very sensitive to the angular variations of flow encountered in free air streams which alters the pressure distribution of the airfoil and induces small oscillatory rotational forces to the rotor.

Again, viewing FIG. 7, we shall consider the opposing blade which would have a reversed flow i.e., from right to left. It may easily be seen that the flow passing the thin edge of the airfoil may be subjected to separation from the inner convex surface very readily, thus generating a high drag which in this sense is a forward rotational force which drives the rotor forward to a position that is favorable for this upstream facing blade to now generate its own forward rotational thrust and forward rotation is now self sustaining.

Having shown airfoil camber and thickness distribution as major contributors to the initiation of rotation I shall now relate the contribution of chord, maximum thickness, and leading edge radius. One may readily see that changes in the chord length, along the camber line, changes the angle of the leading and trailing edges relative to the flow stream and may substantially alter the conditions disclosed in the prior paragraphs. Changes in the thickness distribution or maximum thickness, changes the closing angle of the trailing edge, and alters the pressure distribution of the airfoil and as such both effect the initial starting characteristics of said rotor.

The exact mechanism of operation within the intermediate range of rotational speed remains un-defined, however, certain facts have been ascertained by wind tunnel tests. First, that the same general rules that provide a self starting capability provide good performance in this region of operation and secondly, that thickness and thickness distribution can be very critical through this range of speeds inasmuch as wind tunnel tests indicate that 19% (thickness/chord) ratio airfoils provide transition from low to high speed at the lowest wind stream velocity and any departure in thickness, either more or less, requires an increase in wind stream velocity, that when plotted graphically shows an apparently symmetrical curve rising steeply in either direction (thicker or thinner) from the minimum point at 19%, to perform the transition from low to high speed.

A cambered airfoil representative of my invention (FIG. 5) is shown in FIG. 9 now superimposed on a curved flow field similar to that encountered in high speed operation. It may readily be seen that such airfoil assumes a relationship to the airstream that is most conducive to minimal drag, and with any change in angle of attack will develop a lifting force relative to said angle. It may now be understood how this general family of airfoils can maximize the application of principles described in the Darrieus turbine.

FIG. 8 shows an airfoil of the prior art type superimposed on a linear flow field as might be encountered at initial starting conditions. As shown, this flat symmetrical (uncambered) airfoil is in a non-lifting position, has very small center of pressure travel characteristics, and, as a result, exerts only its drag (negative rotational) force to the rotor system. In addition, this type of airfoil has very low reverse to forward drag characteristics and as a result, is ineffective for a self-starting system.

FIG. 10 shows the same flat symmetrical airfoil superimposed on a curved flow field as may be encountered in high speed rotation. From this it may readily be determined that the airfoil now exhibits an apparent reversed camber relative to the flow stream, this becomes obvious when viewing FIG. 11 which is a transformation to linear from the curved flow field of the prior FIG. 10. I have now shown that increasing blade chord in rotors of the prior art results in reversed lift function and a degradation of performance.

At the onset the worst possible condition i.e. a standing rotor at a position generally perpendicular to the flow stream will be examined. A two bladed rotor will be considered.

In this position the forces acting to rotate the rotor are due to minute fluctuations in the flow stream and as a result are very small. The only forces acting would be a very small variation in the pitching moment caused by the center of pressure travel in the fluctuating airstream, and the difference in drag between the upstream facing and downstream facing airfoils. This in turn induces a small rotational oscillation in the rotor which by the small angular change generates larger excursions of the center of pressure travel. Thus, the rotational oscillations increase in amplitude until such magnitude is attained as to exceed the angle at which the flow lines, over the trailing edge of the down wind facing airfoil, remain attached to the airfoil profile. This detachment of flow from the trailing portion of the blade, occurs rapidly causing a corresponding increase in drag to this side of the rotor thereby, generating a strong forward rotational force in the rotor. The rotor may start directly forward or may require one or more excursions into this region to exceed the retarding force that occurs slightly forward, in a rotational sense, of perpendicularity to the flow stream. Once having exceeded this retarding force the rotor proceeds forward building energy with each turn until such point at which the usual aerodynamic forces, acting on the rotor, balance and maximum speed is attained. At the same time the downstream drag forces previously described continue in decreasing proportion to the conventional driving forces of the Darrieus rotor until a "tip speed to wind speed" ratio of 1-1 is attained. Meanwhile the conventional driving forces, described in the Darrieus patent, have increased to a magnitude that now exceeds the retarding forces generated by the rotor blade during the portion of its cycle wherein the angle of approach exceeds the angle of flow separation over the blade profile. As the rate of rotation increases the approach angle decreases until the conditions described in the Darrieus patent exist throughout the rotor cycle.

If two or more blades are used they are preferably equally spaced angularly, around the turbine axis.

In summary, I will state the ten basic rules of design controlling the operation of my new turbine.

1. Single bladed rotors will not consistently perform the initial start directly forward. However, after making one full rotation, the rotor will continue and accelerate to full high speed rotation.

2. Double bladed rotor airfoils must be designed within a limited envelope of camber, thickness, thickness distribution, and chord÷rotor diameter, as described herein, to initiate start-up and traverse of intermediate range of speeds.

3. Double bladed rotors having flat symmetrical airfoils most frequently will not perform initial start-up from standing position.

4. Airfoils of 19 percent chordal thickness have shown the most desirable start-up and traverse characteristics.

5. Decreasing chord÷rotor diameter ratio increases maximum speed with some loss in maximum torque and low speed performance. Excessive decrease in chord÷rotor diameter ratio will eliminate initial start-up and ability to traverse the intermediate range.

6. Increasing chord÷diameter ratio increases low speed torque with some sacrifice in maximum speed.

7. Excessive chamber or lack thereof will eliminate initial start-up capability and severely degrade or eliminate the ability to traverse the intermediate range.

8. Excessive increase or decrease in camber deteriorates high speed performance.

9. Three bladed rotors will perform initial start-up with very narrow blades but require airfoil design constraints similar to that of two bladed rotors to traverse the intermediate range.

10. Three bladed rotors of the larger chord÷rotor diameter ratio's provide start-up and traverse at lower wind speed and are desirable for high torque applications at low prevailing wind speeds.

I claim to have invented:

1. In a fixed geometry wind turbine:
   a blade, said blade comprising a fixed geometry upwardly extending elongated element which is relatively long as compared to its width and thickness,
   said blade being mounted for rotation about a vertical axis,
   said blade having two sides, the first of which faces said axis and the second of which, faces away from said axis, the improvement comprising:
   said blade having a representative cross-section in a plane transverse to said axis, that includes a cambered profile, the median of said blade cross-section profile being substantially represented by the arc of a circle whose center is at or near said axis of rotation,
   said blade having a well rounded leading edge in combination with a trailing edge which is thin compared to the leading edge, such leading and trailing edges being connected by smooth continuous contours of thickness distribution most conducive to high lift to drag ratio,
   said blade having a thickness normal to said axis, at the maximum point, of about 19% of the chord width in said cross-section,
   all of the parts of said wind turbine rotor comprising a fixed geometry unit, said blade comprising means providing high lift to drag ratios having high drag characteristics in reversed flows and large center of pressure travels, so that said turbine will start at low wind speed, will accelerate through the intermediate rotational speed range, and will run at high rotational speeds in response to un-altered naturally occurring winds.

2. In a fixed geometry wind turbine,
a blade, said blade having a chord,
said blade being mounted for rotation about a vertical axis, and comprising an upwardly extending elongated fixed geometry element that is long compared to its width and thickness,
said blade having a thickness normal to said axis, at its maximum point, of about 19% of said chord, so as to provide improved self-starting and accelerating capability,
said blade having a curved camber line, said camber line having a concave side which faces said axis,
all of the parts of said wind turbine rotor comprising a fixed geometry unit, said blade comprising means providing high lift to drag ratios having high drag characteristics in reversed flows and large center of pressure travels, whereby the blade will tend to start rotating at low wind speeds, will accelerate through the intermediate rotational speed range, and will run at high rotational speeds, in response to un-altered naturally occurring winds, where U/V exceeds 1, with U being the tip speed of the blade and V being the velocity of the ambient wind.

3. In a fixed geometry wind turbine,
a blade, said blade comprising a fixed geometry upwardly extending elongated element which is relatively long as compared to its width and thickness,
said blade being mounted for rotation about an axis transverse to the direction of the wind,
said blade having cross-section means comprising a well rounded leading edge, and a smoothly contoured profile including
a camber to the mean line of said blades cross-sectional profile having a concave side which faces said axis, thereby to provide a high lift to drag ratio and high drag in reversed flows,
said blade having a chord width of about 24 to 40% of the radius of blade rotation and having a thickness normal to said axis of about 19% of the chord width,
all of the parts of said wind turbine rotor comprising a fixed geometry unit, said blade comprising means so that said turbine will start rotating at low wind speeds, will accelerate through the intermediate rotational speed range, and will run at high rotational speeds, in response to naturally occurring winds,
whereby to provide improved self-starting and accelerating capability.

4. In a wind turbine, as defined in claims 1, 2 or 3 in which there are a plurality of said blades angularly spaced equally around said axis, to provide said turbine with self-starting capability.

5. In a fixes geometry wind turbine,
a blade, having a chord,
said blade being mounted for rotation about a vertical axis, said blade comprising a fixed geometry upwardly extending elongated element which is relatively long as compared to its width and thickness,
said blade having a chord on the order of 24 to 40% of the blade radius, to provide self-starting capability, said blade having a maximum thickness on the order of 19% of the chord of the blade,
said blade having cross-section means comprising leading and trailing edges and a curved camber line having a concave side which faces inwardly and providing high lift to drag ratios with high drag in reverse flows,
whereby to provide self-starting capability,
said blade having an angle of attack, negative to the circular path traveled by the said blade about its own axis of rotation, to provide a controlled ratio of rotor blade velocity to wind stream velocity,
all of the parts of said wind turbine rotor comprising a fixed geometry unit, said blade comprising means so that said blade will start at low wind speeds, will accelerate through the intermediate rotational speed range, and will run at controlled high rotational speeds in response to un-altered naturally occurring winds.

6. A wind turbine, as described in claim 5, to provide an improved and highly sensitive flow meter, wind speed indicator and the like.

7. In a fixed geometry wind turbine,
a blade,
means mounting said blade for rotation about an axis perpendicular to the direction of the wind, said blade comprising a fixed geometry upwardly extending elongated element which is relatively long as compared to its width and thickness,
the improvement comprising:
said blade characterized by high lift to drag ratios and high drag in reversed flow and including a means, to provide the self-starting characteristics of the turbine, comprising a convex leading portion which increases to a maximum blade thickness which is greater than 10% of the chord of the blade and then decreases in thickness to its trailing end, said blade having a curved camber line having a concave side which faces said axis, the combination thereby to provide such excursions of the center of pressure of said airfoil so that said blade will start and accelerate through intermediate speeds into the high speed range of operation due to un-altered naturally occurring wind,
said blade, and said means for mounting the same for rotation, comprising a fixed geometry unit.

8. A fixed geometry wind turbine as defined in claim 7 in which said convex leading portion increases to a maximum blade thickness which is on the order of 19% of the chord of the blade and having a large center of pressure travel.

9. In a fixed geometry wind turbine as defined in claim 8, said blade having a chord on the order of 24 to 40% of the distance of said blade from said axis.

10. In a fixed geometry wind turbine as defined in claims 7, 8 or 9 in which there are at least two of said blades located at different angular positions about said axis, to improve the self-starting capability.

11. In a fixed geometry wind turbine,
support means,
blade means mounted for rotation, upon said support means, about a vertical axis, said blade means comprising an elongated upwardly extending fixed geometry wind driven blade element having leading and trailing edges being connected by smooth continuous contours of thickness distribution providing high lift to drag characteristics with large excursions in the center of pressure, said contours comprising two surfaces one of which faces said vertical axis,
said blade having a curved camber line having a concave side which faces inwardly, said blade means having a contour and a thickness to chord ratio which will allow the blade to accelerate the blade means from a standstill to a tip speed ratio substantially within the high speed range of rotation in response to un-altered naturally occurring wind flow acting as the only power source for accelerating said blade means and including chord, camber, thickness, and thickness distribution, interrelated to achieve such acceleration.

12. In a fixed geometry wind turbine as defined in claim 11:
said blade means having a cross-section profile camber which conforms substantially to the arc of a circle having the concave side facing said vertical axis.

13. In a fixed geometry wind turbine, as defined in claim 11:
said blade means including means which will accelerate the blade means from a standstill through an intermediate speed where the tip speed ratio is about 1 to a speed of substantially higher order in response to free unconfined air wind flow acting as the only energy source for accelerating said blade means and including chord, camber, thickness, and thickness distribution, interrelated to achieve such acceleration.

14. In a fixed geometry high speed wind turbine as defined in claim 13:
said blade means having a cross-section profile camber line which conforms substantially to the arc of a circle and having the concave side facing said vertical axis, to provide said center of pressure excursions.

15. In a transverse axis wind turbine providing an improved fixed geometry rotor,
said fixed geometry rotor having means for rotation about said axis, including means mounting at least one fixed geometry blade for rotation about said axis,
said blade being mounted for rotation about said axis to circumscribe a volume of space,
the rotor improvements comprising:
said blade having a cross-section profile
representative of a family of airfoils having thickness distribution conducive to high lift, low drag, large center of pressure travel, and a high drag characteristic in reversed flows,
said blade having a representative cross-section profile; and having a curved median or camber line having a concave curvature which faces said axis and provided with smooth continuous curvature on both the outermost and innermost surfaces,
said cambered airfoil having excursions in the center of pressure travel to provide variations in the pitching moment and thereby effect increasing rotational oscillations leading to forward rotation from the standing position,
said airfoil having sufficiently high lift and sufficiently low drag characteristics to provide adequate torque in the intermediate range of rotor speeds to accelerate the rotor through the intermediate into the high speed range of rotation,
said rotor improvements including a thickness to chord ratio which together with the other of said rotor improvements provide the inherent ability to consistently initiate forward rotation and accelerate through the intermediate into the high speed range of rotation.

16. A wind turbine as defined in claim 15 in which said volume of space is defined by a line of revolution about said axis, said line extending from one point on said axis to another point on said axis and comprising a concave configuration facing said axis and extending between said points.

17. A wind turbine as defined in claim 15 in which said volume of space is cylindrical.

18. A wind turbine as defined in claim 15 in which said volume of space is a frustum of a cone.

19. A wind turbine as described in claim 15 having a single blade thereby to provide maximum torque per square foot of blade area.

20. A wind turbine as described in claim 15 having two blades thereby to combine the forces acting on the upstream and downstream facing blades and provide more improved starting and accelerating capability.

21. A wind turbine as described in claim 15 having three blades thereby to provide greater low speed torque.

22. A wind turbine as described in claim 15 having a blade chord width of about 12 to 20% of said rotor diameter and a blade maximum thickness of about 19% of said blade chord width, the combination to provide improved self-starting and accelerating capability.

23. A wind turbine as described in claim 15 wherein said blade chord width may be from 20% of said turbine's diameter to 12% or less of said turbine's diameter,
said blade cross-section profile of 20% chord to diameter ratio having on the order of 19% maximum thickness to chord width to provide said blade with large center of pressure travel and high drag in reversed flow thereby generating a forward rotational force in such part of the rotor blade that is moving less than the ratio of blade speed to wind speed of 1 to 1,
said cross-section profile of 12% or less chord diameter ratio having a maximum blade profile thickness of 10 to 12% of said chord width thereby to increase said turbine's rotational speed capability in such part of the rotor blade as is moving at the high speed ratio range.

24. A wind turbine as described in claim 15 having a blade chord to turbine diameter ratio of 12 to 20% and thickness to chord ratio of 10 to 19% thereby to provide a turbine of capability to initiate rotational motion from a standing position and accelerating therefrom into the high speed range of rotational speed.

25. A wind turbine as defined in claim 22 in which the turbine has only one blade.

* * * * *